United States Patent Office 3,472,799
Patented Oct. 14, 1969

3,472,799
SELF-EXTINGUISHING THERMOPLASTIC COMPOSITIONS
Heinz Burger, Ludwigshafen (Rhine), Guenther Daumiller, Wingertsberg, Johannes Grohmann, Ludwigshafen (Rhine), Ernst-Guenther Kastning, Assenheim, Pfalz, Heinrich Mohr, Frankenthal, Pfalz, and Lothar Reuter, Heinz Weber, and Herbert Willersinn, Ludwigshafen (Rhine), Germany, assignors to Badische Anilin- & Soda-Fabrik Aktiengesellschaft, Ludwigshafen (Rhine), Germany
No Drawing. Filed July 18, 1966, Ser. No. 565,682
Claims priority, application Germany, July 21, 1965, B 82,939
The portion of the term of the patent subsequent to July 22, 1986, has been disclaimed
Int. Cl. C08f 47/10; C09k 3/28
U.S. Cl. 260—2.5        7 Claims

ABSTRACT OF THE DISCLOSURE

An improved self-extinguishing composition consisting essentially of a styrene polymer, an organic bromide, and 0.01 to 5% by weight of a polymer obtained by dehydropolymerization of an araliphatic monomer.

---

This invention relates to self-extinguishing thermoplastic compositions containing styrene polymers and organic bromides.

The term "self-extinguishing" as employed herein in respect of thermoplastic compositions means that moldings prepared from such compositions are incapable of supporting a flame for more than 20 seconds after they have been held in an open flame, ignited and then removed from the flame with a gentle movement.

It is known that compounds containing halogen can be used as fire-retarding agents for self-extinguishing thermoplastic polymers. In order to render the polymer, e.g. a styrene polymer, self-extinguishing or non-flammable it is necessary to incorporate relatively large amounts of organic halides. Many of the properties of the styrene polymers, e.g. the tensile strength, impact strength and heat distortion temperature, are however thereby detrimentally affected.

It is also known that the fire-retarding effect of organic halides dispersed in the polymers can be enhanced by additives so that adequate fire-retarding action can be achieved by substantially smaller amounts of these substances. Thus it is possible to improve the fire-retarding action of organic bromides by admixing organic peroxides. Organic peroxides have the disadvantage, however, that they are toxic and sometimes readily undergo explosive decomposition. Susceptible persons handling such peroxides may contract dermatosis. Moreover, expensive and troublesome precautions are necessary when handling peroxides to avoid explosions. It is also known that peroxides slowly decompose even at room temperature so that polymer compositions containing organic bromides and peroxides may lose their self-extinguishing characteristics in storage. Moreover the mechanical properties of polymer compositions containing peroxides undergo gradual deterioration by degradation of the polymer chains.

It is an object of the present invention to provide self-extinguishing thermoplastic compositions comprising styrene polymers and organic bromides which do not have the disadvantages of the prior art compositions.

Another object of the present invention is to provide self-extinguishing or non-flammable thermoplastic compositions comprising styrene polymers and organic bromides in which the content of organic bromides is substantially smaller than that conventionally required for flame-proofing the same polymer with the same organic bromide to the same extent.

A further object is to provide self-extinguishing thermoplastic compositions which can be handled without special precautions.

A still further object of the invention is to provide improved molding materials which may be used for the production of self-extinguishing moldings and contain a styrene polymer and an organic bromide as flame-proofing agent.

Yet another object is to provide improved normally solid thermoplastic polymer compositions capable of being foamed to form self-extinguishing cellular articles and comprising a styrene polymer, an organic bromide and a volatile organic compound as foaming agent.

In accordance with the invention, improved self-extinguishing and/or flame-retardant styrene polymers are provided which contain the organic bromide in combination with 0.01 to 5%, preferably 0.02 to 2%, by weight on the styrene polymers of at least one polymer consisting essentially of repeating units of the formula:

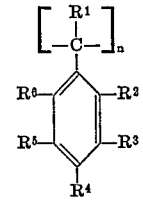

wherein $R^1$ is $R^7$ or $XR^7$, $R^7$ being an aliphatic hydrocarbon radical having 1 to 6 carbon atoms, a phenylalkyl radical or a phenyl radical, said phenyl radical being substituted by 0 to 5 chlorine atoms or alkyl or alkoxy groups having 1 to 4 carbon atoms, and —X— being —O—, —CO— or —COO—; $R^2$ to $R^6$ are members selected from the group consisting of a hydrogen atom, a chlorine atom and an alkyl or alkoxy radical having 1 to 4 carbon atoms, and $n$ denotes an integer of from 3 to about 200.

The polymers having the above formula are polymers of benzyl compounds, such as benzyl ethers, benzyl ketones or benzyl esters, or hydrocarbons containing a benzyl group with two not very firmly bound hydrogen atoms at the methylene group.

The polymers can be obtained by dehydropolymerization or polyrecombination of compounds having the general formula:

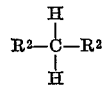

($R^1$ having the above meaning and $R^2$ being unsubstituted or substituted phenyl) as described by V. V. Korshak et al. in "Polymer Science U.S.S.R.," vol. 1 (1960), pages 341 to 350, and volume 3 (1962), pages 925 to 935.

Examples of compounds which are suitable for the production of the synergistic polymers are ethylbenzene, ethyltoluene, diphenylmethane, benzyl benzoate, benzyl propionate, methyl benzyl ketone, dibenzyl ether, xylyl benzyl ether, phenyl benzyl ether, methyl benzyl ether, 1-ethyl-3,5-dichlorobenzene and methoxyphenyl benzyl ether.

Dehydropolymerization or polyrecombination of the said benzyl compounds can be carried out by treating these compounds at elevated temperature, preferably at temperatures of about 120° to 230° C., with compounds supplying free radicals, such as peroxides, e.g. tert. butyl peroxide, dibenzoyl peroxide or diacetyl peroxide, oxygen or other oxidizing agents.

The polymer chain growth process occurring in the dehydropolymerization or polyrecombination may be represented as follows:

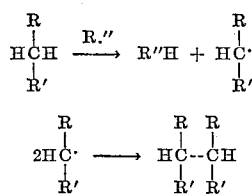

etc.

Polymers obtained by these conventional reactions usually contain from 3 to about 200, preferably to 100, monomer units in the molecule.

The polymers may have linear chain structure, in which case they are soluble and fusible. Polymers of this type are preferred. They may however also be crosslinked. Crosslinked insoluble polymers are advantageously used in finely powered form.

Polymers having the said general formula enhance the effect of the bromine-containing fire-retarding agent. For convenience they will be referred to below as synergistic polymers or synergists.

The terms "styrene polymer" as used in the present specification means a normally solid polymer of unsubstituted styrene or a substituted styrene having the formula $$Ar—CH=CH_2$$

wherein Ar represents an aromatic hydrocarbon radical. Examples of substituted styrenes are vinyltoluene, vinylxylene, isopropenylstyrene, tert.-butylstyrene, α-methylstyrene and mixtures of these monomers with one and another and/or with styrene. Styrene itself is preferred.

The styrene polymers comprise in chemically combined form at least 50% and preferably at least 70% by weight of one of the styrenes. The term "styrene polymer" includes well-known addition copolymers of styrene or substituted styrenes with less than 50% and preferably less than 30% by weight of at least one other readily polymerizable olefinically unsaturated compound having the group $CH_2=C<$, such as -methylstyrene, methacrylonitrile, acrylonitrile, esters of acrylic or methacrylic acid and alkanols having 1 to 8 carbon atoms vinylpyridine, N-vinylcarbazole and butadiene. Examples of suitable copolymers are copolymers of 70 to 80% by weight of styrene and 20 to 30% by weight of acrylonitrile, 70 to 80% by weight of styrene and 20 to 30% by weight of acrylonitrile, 70 to 80% by weight of styrene and 20 to 30% by weight of -methylstyrene, 75 to 85% of styrene and 75 to 25% by weight of methyl methacrylate, or 90 to 95% by weight of vinyltoluene and 5 to 10% by weight of vinylpyridine. Copolymers of styrene which contain from 0.001 to 1.0% and preferably from 0.01 to 0.6% by weight of units of divinyl compounds such as divinylbenzene or butanediol diacrylate may also be used for the purposes of this invention.

The terms "styrene polymer" also includes impact-resistant grades such as are prepared by mixing polystyrene or any of the said styrene copolymers with minor amounts, e.g. 2 to 15% by weight on the styrene polymers of elastomeric polymers such as natural or synthetic rubber or elastomeric polymers of esters of acrylic or methacrylic acid with alkanols having 4 to 8 carbon atoms. The impact-resistant styrene polymers may also be prepared by polymerizing styrene or a mixture of at least 50% and preferably 70% by weight of styrene and on another olefinically unsaturated monomer as mentioned above in the presence of 2 to 10% by weight on the monomers of a finely divided elastomeric polymer such as natural or synthetic rubber.

The organic bromides used are well-know flame-proofing agents. They preferably contain at least four carbon atoms and have a plurality (at least two) of bromine atoms attached to the carbon atoms. The bromine atoms should make up more than 40% by weight of the organic bromide.

Those organic bromides are particularly suitable which are not volatile, which have little or no plasticizing action on the styrene polymers and which have no troublesome odor. Organic bromides containing a plurality of bromine atoms in an aliphatic or cycloaliphatic radical are very suitable. In these organic bromides the bromine atoms are preferably attached to adjacent or vicinal carbon atoms in the aliphatic or cycloaliphatic radical. Examples of suitable organic bromides are bromo-substituted alkanes such at 1,2,3,4-tetrabromobutane, 1,2,4-tribromobutane or tetrabromopentane, bromo-substituted cycloalkanes such as tribromotrichlorocyclohexane, tetrabromodichlorocyclohexane, pentabromomonochlorocyclohexane, hexabromocyclohexane, 1,2,5,6,9,10 - hexabromocyclododecane or octabromohexadecane; and alsodibromoethylbenzene, 1,2 - di - (dibromomethyl-)benzene and pentabromodiphenyl ether; esters and acetals of dibromopropanol, such as tris (2,3-dibromopropyl)-phosphate and esters of bromoalkanic acids such as methyl α, β-dibromopropionate. Bromination products of linear and cyclic oligomers or polymers of butadiene or isoprene such as hexabromocyclododecane and octabromohexadecane, or brominated natural or synthetic rubber are especially suitable.

The minimum amount of organic bromide to be contained in the composition depends upon the nature of the organic bromide and the styrene polymer. The organic bromides are used in such amounts that the compositions or molding materials have a bromine content of at least 0.1% by weight and as a rule not more than 5% by weight, preferably 0.5 to 3% by weight. Usually, the amount of organic bromide used is substantially smaller than is required to render the polymer self-extinguishing or non-flammable if the organic bromide is used alone. If the organic bromide is employed in an amount sufficient to render the polymer self-extinguishing, the compositions are flameproofed more effectively by incorporating a polymer (c) according to this invention.

The compositions may be mixed with additives, for example fillers, pigments, slip additives, plasticizers, antistatic, aging retardants, stabilizers or compounds which promote expansion.

The compositions or molding materials may be in finely particled form, for examples in the form of beads or cylindrical granules or in the form of lumps such as are obtained by grinding bulk polymers. The particles advantageously have a diameter of 0.1 to 6 mm., preferably about 0.4 to 3 mm.

The molding materials may be processed, for example by injection molding or extrusion, into self-extinguishing moldings or profiles. Owing to their relatively low content of organic bromides the molding materials according to this invention have softening points which differ only insignificantly from those of the styrene polymers contained therein.

Compositions or molding materials according to this invention capable of being foamed to form self-extinguishing expanded articles are of particular interest. They contain in addition to the styrene polymer, the organic bromide and the synergistic polymer a volatile organic compound as foaming agent.

Preferred foaming agents are liquid or gaseous organic compound which does not dissolve the styrene polymer and which have a boiling point which is below the softening point of the styrene polymer, for example saturated aliphatic or cycloaliphatic hydrocarbons containing 3 to 7 carbon atoms in the molecule, such as propane, butane, pentane, hexane, heptane, cyclohexane or petroleum ether, or halohydrocarbons, preferably clorohydrocarbons or fluorohydrocarbons having 1 to 6, particularly 1 to 4 carbon atoms, such as methyl chloride, dichlorodifluoromethane or 1,2,2-trifluoro-1,1,2-trichloroethane. Mixtures of foaming agents may also be contained in the compositions or molding materials. It is advantageous to use 3 to 10% by weight of foaming agent on the styrene polymer.

Self-extinguishing expanded articles are obtained from such expandable compositions for example when fine particles of these materials are heated in a gas-permeable mold to a temperature above the softening point of the styrene polymer contained in the composition so that the particles expand and fuse together to form a molding. These expandable molding materials may also be processed into foam sheet by means of extruders.

To prepare self-extinguishing foam sheet, the components of the compositions or molding materials may be mixed with a foaming agent. Mixing is advantageously carried out in continuous equipment, for example in an extruder. Temperatures which are above the softening point of the polymer are used. The mixtures should be kept under a pressure that is at least equal to the pressure produced by the foaming agent to prevent the mixture from expanding during mixing or during heating up to a temperature above its softening point. The expression pressure produced by the foaming agent is defined as the autogenous pressure at the temperature used. When organic liquids, or gaseous compounds below the critical temperature, are used as foaming agents, the pressure of the foaming agent corresponds to the vapor pressure of the foaming agent which is set up above the mixture of styrene polymer and expanding agent.

The mixture is extruded into a zone of lower pressure. The pressure in this zone should be less than the pressure of the foaming agent at the prevailing temperature so that the mixture expands. In most cases it is expedient to extrude the mixtures into a zone which is at atmospheric pressure. Sometimes it may be advantageous to use a pressure below atmospheric.

To prepare the compositions or molding materials, the synergistic polymers may be incorporated with the styrene polymers together with the organic bromide or the components may be mixed individually in any sequence, if desired with other components. They can be incorporated with the styrene polymer by any method which ensures homogeneous distribution of the agents in the polymer and does not cause appreciable deterioration or decomposition of any of the components. Incorporation may, for example, be effected on rollers, in an extruder or in a kneader. It is also possible, for example in the production of cast film, to add the synergistic polymer and the organic bromide to a solution of the styrene polymer in a solvent, preferably a volatile solvent, such as benzene, acetone or dioxane, and then to evaporate the solvent.

In many cases the synergistic polymer and the organic bromide can be added to the monomeric components of the styrene polymers prior to polymerization.

It is a particular advantage that the synergistic polymers do not disturb the polymerization of the styrene. To prepare the compositions or molding materials according to this invention, the monomeric components of the styrene polymers can therefore be polymerized in the presence of synergistic polymers and the organic bromides with or without a foaming agent. In this way particularly homogeneous distribution of the fire-retarding agent and the synergistic polymer in the styrene polymer is achieved. The styrene and the comonomer mixed with an organic bromide, a synergistic polymer and preferably a foaming agent can be polymerized in bulk, i.e. in the absence of substantial absence of inert diluent or solvent for the styrene polymer or advantageously in suspension in an inert liquid medium, e.g., at temperatures between 65 and 130° C. and in the presence of a peroxide catalyst cuch as benzoyl peroxide, acetyl peroxide or hydrogen peroxide.

The synergistic polymers have the advantage of being safe to handle, unlike other conventional compounds which enhance the flame-proofing effect of the organic bromides. It has been found moreover that the self-extinguishing property is not lost even after prolonged storage at elevated temperatures. It is a special advantage however that the synergistic polymers generally have no plasticizing effect on the styrene polymers and are not volatile. Furthermore, the compositions do not involve any health hazard.

The self-extinguishing properties of the compositions are tested in the following way: To test unexpanded molding materials moldings having the dimensions 0.1 x 10 x 30 cm., and to test expanded molding materials, moldings having the dimensions 0.5 x 15 x 40 cm., are held for five seconds in a luminous gas flame having a height of 40 mm. and the flame is then removed with a gentle movement. The time (in seconds) before the molding ceases to burn after it has been removed from the flame is a measure of its self-extinguishing characteristics. Untreated or inadequately treated molding materials burn away completely after they have been removed from the gas flame.

The invention is illustrated by the following examples in which parts and percentages are by weight.

Examples 1 to 10

In each case 30 parts of a styrene polymer, a specified amount of an organic bromide and a specified amount of synergistic polymer are dissolved in 100 parts of methylene chloride. 3 parts of pentane is added to the solution. The solution is then poured onto a sheet of glass and the methylene chloride is allowed to evaporate at room temperature. The pentane thus remains homogeneously distributed in the mixture. The film thus obtained is foamed in steam at 100° C. and dried in vacuo for twelve hours at 35° C. The self-extinguishing property of the expanded polymer films obtained are tested by the methods given above. The results are given in the following table in which PS=polystyrene; HBCD=hexabromocyclododecane; OB=percentage by weight of organic bromide; S=synergist; percent=amount in percent by weight; E=time in seconds required for extinction of the flame; TDPP=tris-(2,3-dibromopropyl)phosphate; PDM=polymerized diphenylmethane; PEB=polymerizedethylbenzene; CP=copolymer of 75% by weight of styrene and 25% by weight of acrylonitrile; ABS=mixture of 100 parts copolymer CP and 5 parts of polybutadiene; PPBE=polymerizedphenylbenzylether.

TABLE

| Styrene polymer | OB | S | Percent | E | Example No. |
|---|---|---|---|---|---|
| PS | HBCD | | | | |
| | 1.0 | | | 11.0 | 1 |
| | 1.25 | | | 9.0 | 2 |
| | 1.0 | PDM | 0.1 | 2.7 | 3 |
| | 1.0 | PDM | 0.5 | 2.4 | 4 |
| | 1.25 | PEB | 0.1 | 3.5 | 5 |
| | 1.25 | PEB | 0.5 | 1.7 | 6 |
| | TDPP | | | | |
| | 1.0 | | | >20 | 7 |
| | 1.0 | PEB | 0.5 | 8.0 | 8 |
| CP | HBCD | | | | |
| | 1.0 | | | 12.0 | 9 |
| | 1.0 | PDM | 0.5 | 3.2 | 10 |

We claim:
1. An improved self-extinguishing composition consisting essentially of
   (a) a normally solid thermoplastic styrene polymer containing in chemically combined form at least 50% of styrene and having intimately incorporated therewith
   (b) an organic bromide having a plurality of bromine atoms attached to carbon, said bromine atoms making up more than 40% by weight of the organic bromide, in such an amount that said composition has a bromine content of from 0.1 to 5% by weight and
   (c) from 0.01 to 5% by weight on the styrene polymer of a polymer obtained by dehydropolymeriza- tion of at least one araliphatic monomer having the formula

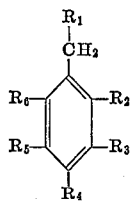

wherein $R^1$ is $R^7$ or $XR^7$, $R^7$ being a member selected from the group consisting of an aliphatic hydrocarbon radical having 1 to 6 carbon atoms, a phenylalkyl radical or phenyl radical wherein said phenyl radical is substituted by 0 to 5 radicals selected from the class consisting of a chlorine atom, alkyl having 1 to 4 carbon atoms and alkoxy having 1 to 4 carbon atoms; X is a member selected from the class consisting of —O—, —CO— and —COO—; and $R^2$, $R^3$, $R^4$, $R^5$ and $R^6$ are members selected from the group consisting of a hydrogen atom, a chlorine atom, alkyl having 1 to 4 carbon atoms and alkoxy having 1 to 4 carbon atoms, said polymer (c) containing 3 to 200 units of said monomer.

2. An improved self-extinguishing composition as claimed in claim 1 wherein the organic bromide contains at least four carbon atoms and a plurality of bromine atoms attached to a radical selected from the group consisting of an aliphatic radical and a cycloaliphatic radical, said bromine atoms constituting more than 40% by weight of the organic bromide.

3. An improved self - extinguishing composition as claimed in claim 1 wherein the styrene polymer is a normally solid thermoplastic addition copolymer of at least 50% by weight of styrene and less than 50% by weight of another readily polymerizable olefinically unsaturated compound selected from the group consisting of acrylonitrile, methacrylonitrile, α-methylstryene, esters of acrylic and methacrylic acids and alkanols having 1 to 8 carbon atoms, vinylpyridine, N-vinylcarbazole and butadiene.

4. An improved self - extinguishing composition as claimed in claim 1 wherein the styrene polymer is a styrene homopolymer.

5. An improved self - extinguishing composition as claimed in claim 1 which contains as a foaming agent 3 to 10% by weight of the styrene polymer of a volatile organic compound which does not dissolve said styrene polymer and has a boiling temperature below 95° C. at 760 mm. pressure and is selected from the group consisting of aliphatic and cycloaliphatic hydrocarbons, chlorohydrocarbons and fluorohydrocarbons.

6. An improved self - extinguishing composition as claimed in claim 1 wherein polymer (c) has the formula

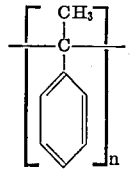

where $n$ is 3 to 200.

7. An improved self - extinguishing composition as claimed in claim 1 wherein the polymer (c) consists essentially of repeating units of the formula

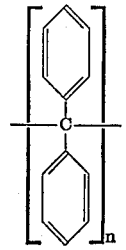

where $n$ is 3 to 200.

References Cited

UNITED STATES PATENTS 3,058,926 10/1962 Eichhorn.
3,338,864 8/1967 Mageli et al.
3,361,687 1/1968 Stahnecker.

GEORGE E. LESMES, Primary Examiner

M. FOELAK, Assistant Examiner

PO-1050
(5/69)

UNITED STATES PATENT OFFICE
CERTIFICATE OF CORRECTION

Patent No. 3,472,799  Dated October 14, 1969

Inventor(s) Heinz Burger et al

It is certified that error appears in the above-identified patent and that said Letters Patent are hereby corrected as shown below:

Column 2, line 53, that portion of the formula reading "$R^2-C$" should read ---$R^1-C$---.

Column 3, line 53, "75" should read "15".

Column 7, line 21, claim 1, "$R^4$, $R^4$" should read ---$R^4$, $R^5$---.

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents